(12) United States Patent
Kikuchi et al.

(10) Patent No.: US 10,585,341 B2
(45) Date of Patent: Mar. 10, 2020

(54) LIGHT SOURCE UNIT AND PROJECTOR

(71) Applicant: CASIO COMPUTER CO., LTD., Shibuya-ku, Tokyo (JP)

(72) Inventors: Ryo Kikuchi, Tokyo (JP); Toshifumi Kase, Tokyo (JP); Naoto Yoshida, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/876,390

(22) Filed: Jan. 22, 2018

(65) Prior Publication Data

US 2018/0231877 A1 Aug. 16, 2018

(30) Foreign Application Priority Data

Feb. 15, 2017 (JP) ................. 2017-025503

(51) Int. Cl.
| | |
|---|---|
| *G03B 21/16* | (2006.01) |
| *G02B 26/00* | (2006.01) |
| *G03B 21/20* | (2006.01) |
| *F21S 10/00* | (2006.01) |
| *G02B 7/00* | (2006.01) |
| *H04N 9/31* | (2006.01) |
| *G03B 21/14* | (2006.01) |
| *F21V 29/502* | (2015.01) |

(52) U.S. Cl.
CPC .......... *G03B 21/16* (2013.01); *G02B 26/008* (2013.01); *G03B 21/204* (2013.01); *F21S 10/007* (2013.01); *F21V 29/502* (2015.01); *G02B 7/008* (2013.01); *G03B 21/145* (2013.01); *G03B 21/208* (2013.01); *H04N 9/3141* (2013.01); *H04N 9/3144* (2013.01)

(58) Field of Classification Search
CPC combination set(s) only.
See application file for complete search history.

(56) References Cited

U.S. PATENT DOCUMENTS 9,152,023 B2 * 10/2015 Lee .................. G03B 21/16
9,423,676 B2    8/2016 Tsuchiya et al.
9,625,798 B2    4/2017 Kase
(Continued)

FOREIGN PATENT DOCUMENTS

JP    2010139635 A    6/2010
JP    2012018762 A    1/2012
(Continued)

OTHER PUBLICATIONS

Japanese Office Action (and English language translation thereof) dated Nov. 1, 2018 issued in counterpart Japanese Application No. 2017-025503.

*Primary Examiner* — Christopher Stanford
(74) *Attorney, Agent, or Firm* — Holtz, Holtz & Volek PC

(57) ABSTRACT

A light source unit according to an embodiment comprises: a support member that supports a heat generator, a heat transfer member connected to the support member, and a heat dissipating member connected to the heat transfer member all of which are provided inside a space formed by a case and a cover. The heat dissipating member is arranged to extend from the inside of the space to an outside of the space via a space sandwiched by the case and the cover.

19 Claims, 6 Drawing Sheets

(56) References Cited

U.S. PATENT DOCUMENTS

| | | | |
|---|---|---|---|
| 2002/0003704 A1* | 1/2002 | Ohmae | F21S 10/007 362/293 |
| 2005/0185146 A1* | 8/2005 | Fujimori | G02F 1/133385 353/61 |
| 2006/0215125 A1* | 9/2006 | Doi | G03B 21/16 353/52 |
| 2006/0256300 A1* | 11/2006 | Chin | G03B 21/14 353/81 |
| 2007/0024815 A1* | 2/2007 | Oyama | G03B 21/16 353/54 |
| 2007/0216871 A1* | 9/2007 | Yoshikawa | G03B 21/16 353/30 |
| 2007/0273839 A1* | 11/2007 | Doi | G03B 21/16 353/57 |
| 2008/0049345 A1* | 2/2008 | Niwa | G02B 26/008 359/889 |
| 2009/0141248 A1* | 6/2009 | Suzuki | G03B 21/16 353/61 |
| 2010/0091251 A1 | 4/2010 | Fujibayashi et al. | |
| 2012/0013854 A1* | 1/2012 | Nishimura | G03B 21/16 353/57 |
| 2014/0375964 A1 | 12/2014 | Tsuchiya et al. | |
| 2015/0029472 A1* | 1/2015 | Lin | G03B 21/16 353/61 |
| 2015/0338725 A1* | 11/2015 | Kase | G03B 21/2013 353/58 |
| 2016/0077326 A1* | 3/2016 | Yamagishi | G02B 26/008 353/61 |
| 2016/0161736 A1* | 6/2016 | Chou | G02B 26/008 362/324 |
| 2016/0291449 A1* | 10/2016 | Masuda | G03B 21/16 |
| 2016/0344988 A1* | 11/2016 | Kase | H04N 9/3144 |
| 2017/0192346 A1* | 7/2017 | Chikayama | G03B 21/16 |
| 2017/0357150 A1* | 12/2017 | Ueda | F21V 29/502 |

FOREIGN PATENT DOCUMENTS

| | | |
|---|---|---|
| JP | 2012221820 A | 11/2012 |
| JP | 2015007694 A | 1/2015 |
| JP | 2015222301 A | 12/2015 |

* cited by examiner

LIGHT SOURCE UNIT AND PROJECTOR

CROSS-REFERENCE TO RELATED APPLICATIONS

The entire contents of JP Patent Application No. 2017-025503, filed on Feb. 15, 2017 are incorporated in the present specification by reference.

BACKGROUND OF THE INVENTION

Field of the Invention

The present invention relates to a light source unit, and a projector comprising s the light source unit.

Description of the Related Art

Today data projectors as projectors for projecting screens of personal computers, video screens, images from image data stored in memory cards, or the like onto a screen are frequently used. In this projector, light emitted from a light source is collected on a micromirror display device called a DMD (digital micromirror device) or a liquid crystal plate, and a color image is displayed on the screen.

For example, JP 2015-222301 A discloses an optical apparatus and an image projector capable of effectively dissipating heat from a light source unit and the whole optical apparatus including the light source unit. This optical apparatus includes a luminescent material light-emitting device in the main light source portion and a luminescent material wheel rotated by a wheel motor. The luminescent material wheel emits light in a range of green wavelengths as luminescent light when irradiated with blue laser light.

Since the blue laser light is directly emitted to the luminescent material wheel, heat is generated as a conversion loss when converting the blue laser light into light in a range of green wavelengths. When the temperature of the luminescent material wheel increases, the temperature of the motor that rotatably supports the luminescent material wheel rises, which may cause troubles such as breakage of the motor. Therefore, cooling is required so as not to raise the temperature of the motor.

From the viewpoint of securing dustproofness the motor of the recent light source units may be mounted in a place where air does not flow in the light source case and cooling is difficult. In general, the light source case itself is cooled, but it becomes difficult to sufficiently cool the motor and its surrounding members as the light source unit has a higher brightness or the like.

In view of the above, it is an object of the present invention to provide a light source unit with improved heat dissipating performance and a projector including the light source unit.

SUMMARY OF THE INVENTION

A light source unit according to an embodiment comprises: a support member that supports a heat generator, a heat transfer member connected to the support member, and a heat dissipating member connected to the heat transfer member all of which are provided inside a space formed by a case and a cover. The heat dissipating member is arranged to extend from the inside of the space to an outside of the space via a space sandwiched by the case and the cover.

A projector according to an embodiment comprises: the above light source unit; a display device which is irradiated with light source light from the light source unit to form image light; a projection side optical system configured to project the image light emitted from the display device onto a screen; and a control module configured to control the display device and the light source unit.

DETAILED DESCRIPTION OF THE PREFERRED EMBODIMENT

Figure 1:
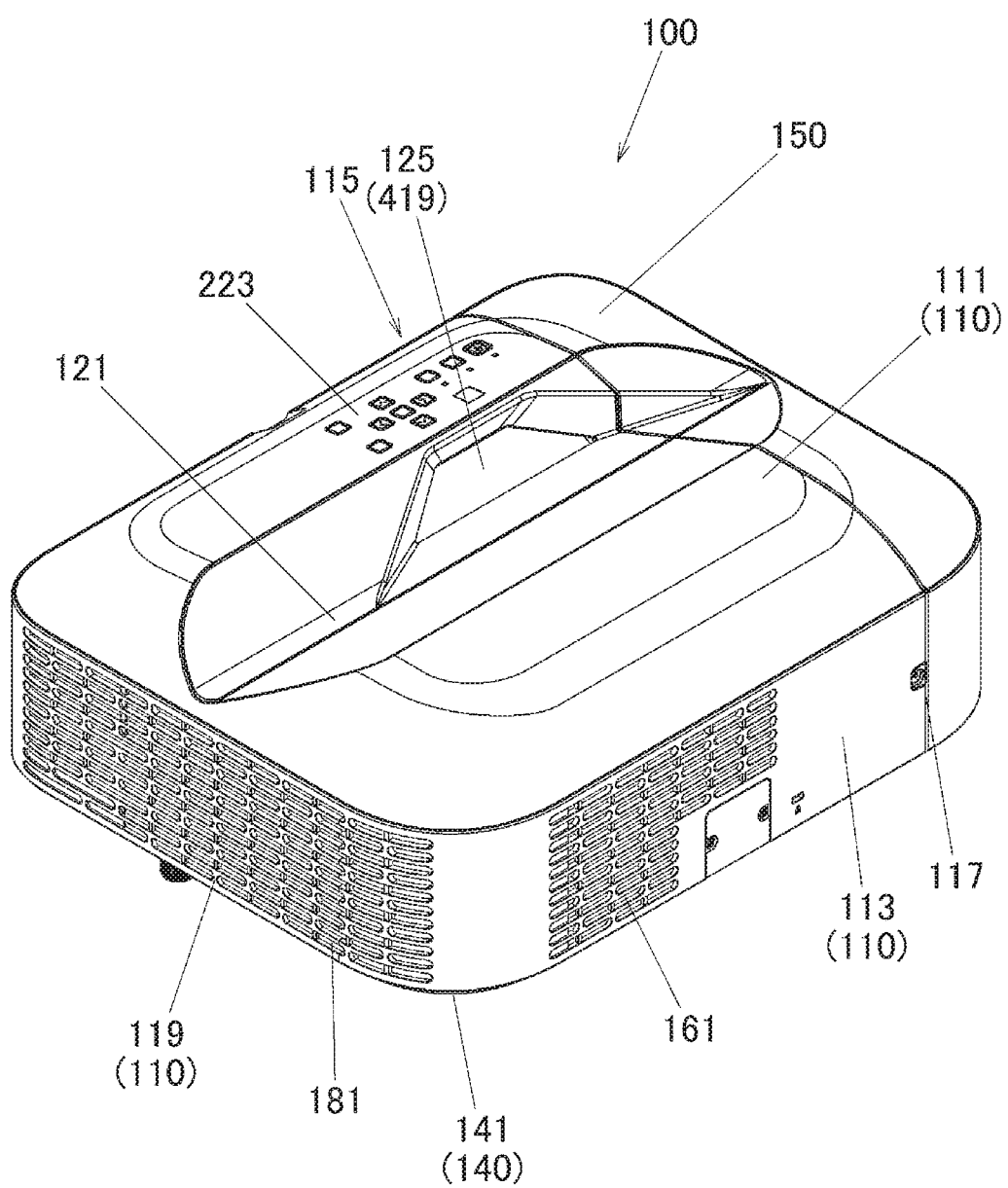
FIG. 1 is an external perspective view of a projector according to an embodiment of the present invention.

Hereinafter, embodiments for carrying out the present invention will be described. FIG. 1 is an external perspective view of a projector 100 according to an embodiment of the present invention. When left and right are referred to with respect to the main body of the projector 100 according to the embodiment, they denote the left-right direction with respect to the projection direction, when front and rear are referred to with respect to the main body of the projector 100, they denote the front-rear direction with respect to the projection direction, and the diagonal lower right direction in FIG. 1 is the front direction.

The projector 100 has a substantially rectangular parallelepiped shape as shown in FIG. 1. The projector 100 includes a housing body made up of an upper case 110 and a lower case 140, and a connector cover 150 covering a left side plate 117 detachable from the housing body. The connector cover 150 is formed in a concave shape so as to cover the outer peripheral edge of the left side plate 117. Various devices and circuit boards on a bottom plate 141 of the lower case 140 are covered by the upper case 110. The projector 100 has a front suction hole 161 in a front side plate 113 of the upper case 110 and an exhaust hole 181 in a right side plate 119. Further, the projector 100 has a rear face side air intake hole and a hole portion for emitting sound from a speaker on a rear plate 115.

A key/indicator portion 223 is provided behind an upper surface plate 111 of the upper case 110. This key/indicator portion 223 is provided with a power switch key, a projection switch key for switching projection on/off, a power indicator notifying of power on/off, and a key or an indicator such as a heating indicator for warning when the light source module, the display device, the control circuit, or the like overheats.

The upper surface plate 111 of the upper case 110 has a substantially V-shaped cut groove 121 extending in the left-right direction across from the right side of the main body to the left side connector cover 150. A projection port 125 is formed in the cut groove 121. The projection port 125 allows image light to be emitted diagonally forward.

Although not shown, the left side plate 117 is provided with a video signal input D-SUB terminal into which an analog RGB video signal is input, an S terminal, an RCA terminal, an audio output terminal, and various types of terminals (group) including a power supply adapter or a plug. The left side plate 117 is also provided with an air intake hole.

Figure 2:
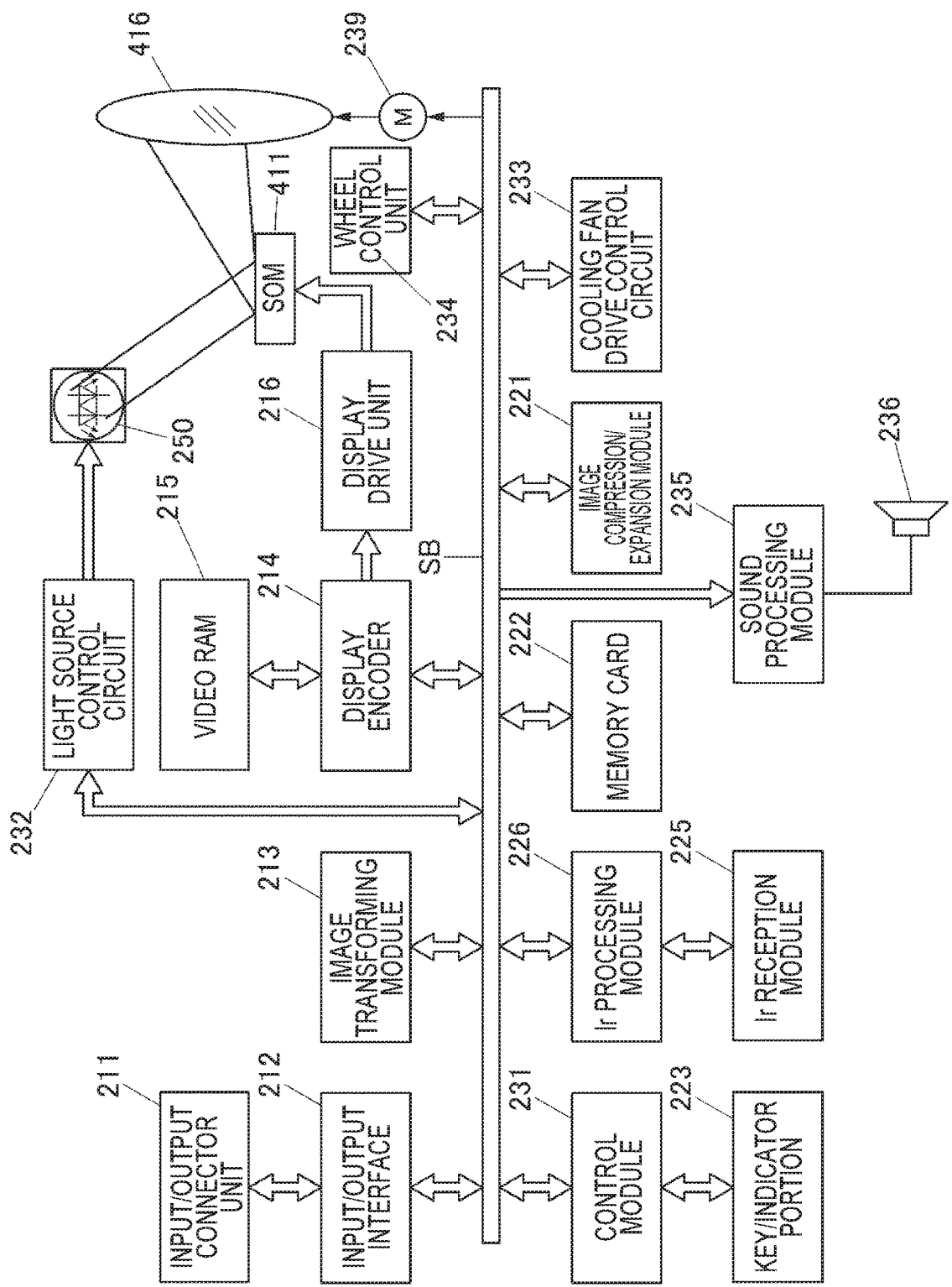
FIG. 2 is a functional block diagram of the projector according to the embodiment of the present invention.

Next, a projector control unit and the like of the projector 100 will be described with reference to the functional block diagram of FIG. 2. The projector control unit includes a control module 231, an input/output interface 212, an image transforming module 213, a display encoder 214, a display drive unit 216, and the like.

After in this projector control unit the image signal of various standards input from an input/output connector unit 211 is converted to be unified into an image signal of a predetermined format suitable for display by the image transforming module 213 through the input/output interface 212, and a system bus (SB), it is output to the display encoder 214.

The control module 231 governs the operation control of each circuit in the projector 100, and includes a CPU as an arithmetic unit, a ROM that permanently stores operation programs such as various settings, a RAM used as a work memory, and the like.

In addition, the display encoder 214 develops and stores the input image signal in the video RAM 215, generates a video signal from the stored contents of the video RAM 215, and outputs it to the display drive unit 216.

The display drive unit 216 serves as a display device control means, and drives a display device 411, which is a spatial optical modulator (SOM), at an appropriate frame rate corresponding to the image signal output from the display encoder 214.

The projector 100 includes a light source unit 250. The control module 231 controls a light source control circuit 232 as a light source control means. This light source control circuit 232 individually controls light emitted from an excitation light shining device 310 and a red light source unit 350 of the light source unit 250, and controls the rotation of a luminescent plate 331 (see FIG. 3) in a green light source unit 330 by a wheel control unit 234 such that light source light in a predetermined wavelength range required for image generation is emitted from the light source unit 250.

The projector 100 irradiates the display device 411 with a pencil of light emitted from the light source unit 250 to form an optical image with the reflected light of the display device 411, and projects and displays the image on the screen or the like via a projection optical system.

The projection optical system includes a movable lens group 416. The movable lens group 416 is driven for zoom adjustment and focus adjustment by a lens motor 239.

The image compression/expansion module 221 reads out the image data recorded on a memory card 222 and expands individual image data that make up a series of dynamic images frame by frame. Then, the image compression/expansion module 221 outputs the image data to the display encoder 214 via the image transforming module 213 so as to enable the display of dynamic images and the like based on the image data stored on the memory card 222.

An operation signal from the key/indicator portion 223 provided on the upper case 110 is sent to the control module 231 immediately after the process. The key operation signal from the remote controller is received by an Ir reception module 225, and the code signal demodulated by an Ir processing module 226 is output to the control module 231.

A sound processing module 235 is connected to the control module 231 via a system bus (SB). The sound processing module 235 includes a sound source circuit such as a PCM sound source, converts the sound data into analog form in the projection mode and the reproduction mode, drives a speaker 236, and makes the sound emission diffusive.

Further, the control module 231 causes a cooling fan drive control circuit 233 to perform temperature detection by a plurality of temperature sensors provided in the light source unit 250 or the like, and controls the rotation speed of the cooling fan from the result of this temperature detection. Further, the control module 231 causes the cooling fan drive control circuit 233 to continue the rotation of a cooling fan even after the power of the main body of the projector 100 is turned off by a timer or the like, or controls to turns the main body of the projector 100 off based on the result of the temperature detection by the temperature sensor.

Figure 3:
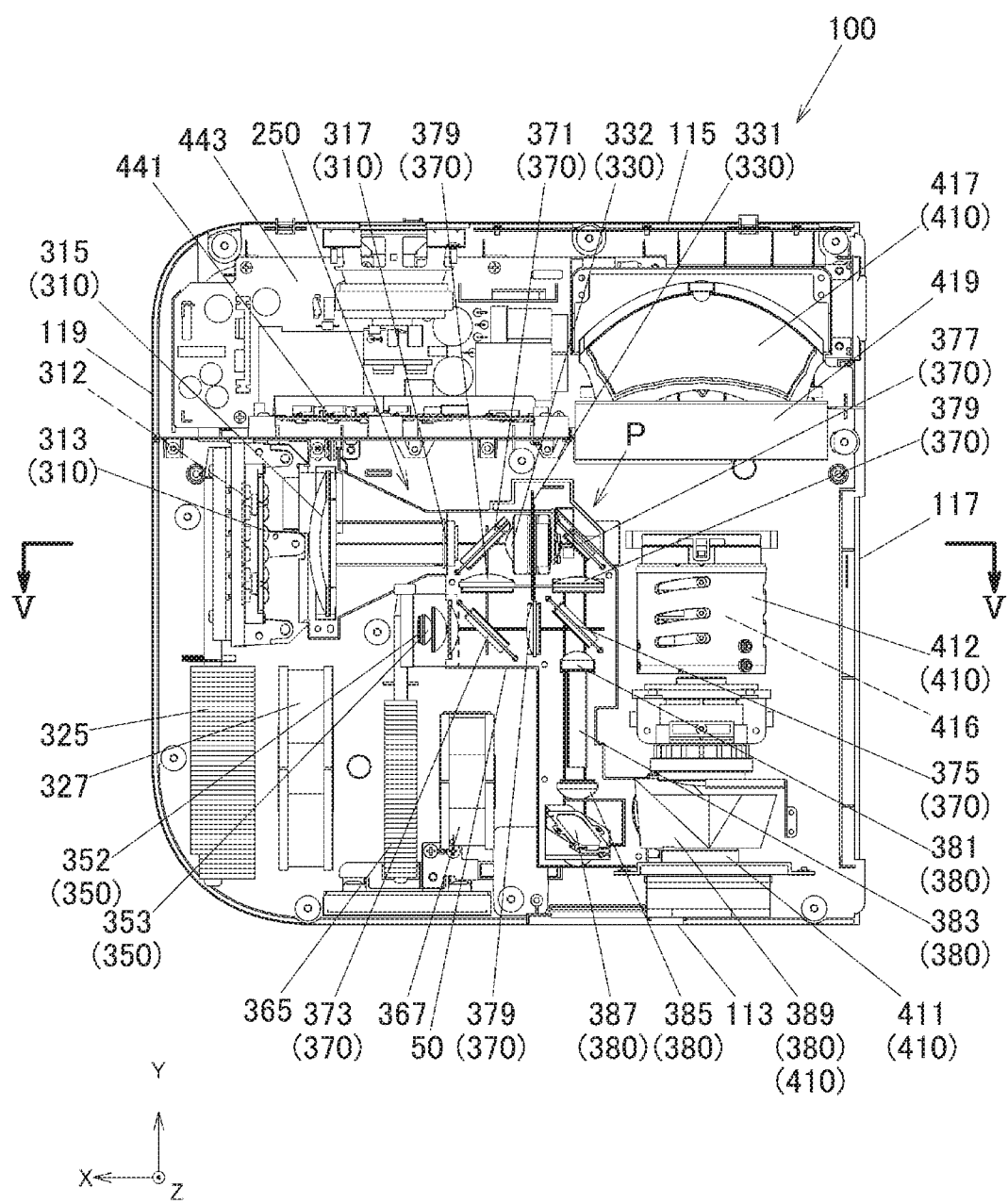
FIG. 3 is a plan view showing an internal structure of the projector according to the embodiment of the present invention.

Next, the internal structure of the projector 100 will be described. FIG. 3 is a schematic plan view showing the internal structure of the projector 100. The projector 100 includes a main control circuit board 441 and a power supply control circuit board 443 in the vicinity of a rear plate 115.

The light source unit 250 includes the green light source unit 330 in a light source case (case) 50. In addition, the light source unit 250 includes a light guiding optical system 370 and a light-source-side optical system 380 as a light guide path. In FIG. 3, the upper case of a light source case 50 is omitted.

The excitation light shining device 310 is disposed in the vicinity of the right side plate 119 in the housing of the projector 100. A plurality of blue laser diodes 312, which are semiconductor light emitting devices, are provided in the excitation light shining device 310. In addition, a collimator lens 313 is disposed on the optical axis of each blue laser diode 312 to convert light emitted from the blue laser diode 312 into parallel light so as to enhance the directivity of light. In the present embodiment, a total of 12 blue laser diodes 312 are arranged in 2 rows and 6 columns and a total of 12 collimator lenses 313 are arranged in 2 rows and 6 columns.

A collective lens 315 is provided on the front face of the collimator lens 313. The collective lens 315 collects light in a range of blue wavelengths emitted from each of the collimator lenses 313, and guides it to a diffuse plate 317. The diffuse plate 317 transmits the incident light in a range of blue wavelengths while diffusing it, and guides it to the green light source unit 330.

The red light source unit 350 includes a red light source 352 and a collective lens group 353. The red light source 352 is a red light emitting diode which is a semiconductor light emitting device that emits light in a range of red wavelengths. The red light source 352 is disposed so that light emitted from the blue laser diode 312 and the optical axis are parallel to each other. The collective lens group 353 collects light in a range of red wavelengths emitted from the red light source 352.

A heat sink 365 of the red light source unit 350 is disposed on a front side plate 113 side of the red light source unit 350. A heat sink 325 of the excitation light shining device 310 is disposed on the front side plate 113 side of the excitation light shining device 310. A cooling fan 327 is disposed between the heat sink 325 and the heat sink 365. A cooling fan 367 is also disposed on the left side plate 117 side of the heat sink 365. The cooling air from the cooling fans 327, 367 is blown to the heat sink 325 of the excitation light shining device 310 and the heat sink 365 of the red light source unit 350. Therefore, the blue laser diode 312 and the red light source 352 are cooled by the respective heat sinks 325, 365.

The luminescent plate 331 constituting the green light source unit 330 is disposed substantially at the center of the projector 100. The luminescent plate 331 is formed in a disk shape and is disposed on the optical path of the excitation light emitted from the excitation light shining device 310. The luminescent plate 331 is rotationally driven by a motor 92 (see FIG. 5).

A collective lens group 332 is disposed on the excitation light shining device 310 side of the luminescent plate 331, and a collective lens 333 (see FIG. 5) is disposed also on a reflecting mirror 377 side, which is opposite to the excitation light shining device 310 side.

The collective lens group 332 collects a pencil of light of the excitation light emitted from the excitation light shining device 310 and transmitting a first dichroic mirror 371 into the luminescent plate 331 and collects the luminescent light emitted from the luminescent plate 331 toward the excitation light shining device 310.

The luminescent plate 331 has as an optical function portion a luminescent light emitting area and a transmission area provided continuously in its circumferential direction. The luminescent light emitting area receives light collected from the excitation light shining device 310 via the collective lens group 332 as excitation light and emits luminescent light in the green wavelength range. The transmission area transmits, or transmits the excitation light emitted from the excitation light shining device 310 while diffusing it.

As the base material of the luminescent plate 331, a metal base material made of copper, aluminum or the like can be used. An annular groove is formed on the surface of the base material on the excitation light shining device 310 side. Mirror processing with silver evaporation or the like is performed to the bottom of this groove, and a green luminescent material layer is laid on the bottom. Further, in the transmission area, a transparent base material having transparency is fitted in a cut through hole portion cut in the base material. In a case where an area that transmits the excitation light while diffusing it is disposed as the transmission area, a transparent base material having fine irregularities formed on its surface by sandblasting or the like is fitted into the cut through hole portion.

When the green luminescent material layer of the luminescent plate 331 is irradiated with light in a range of blue wavelengths emitted from the excitation light shining device 310, the green luminescent material is excited, whereby a light in a range of green wavelengths is emitted in all directions. Light in a range of green wavelengths in a luminescent fashion is emitted to the right side plate 119 side, and enters the collective lens group 332. On the other hand, light in a range of blue wavelengths emitted from the excitation light shining device 310 and entering the transparent area transmits the luminescent plate 331 or transmits the luminescent plate 331 while diffusing it, and enters the collective lens 333 (see FIG. 5) disposed on the back side of the luminescent plate 331 (in other words, on the left side plate 117 side).

The light guiding optical system 370 includes a collective lens for collecting a pencil of light of light in a range of blue wavelengths, light in a range of red wavelengths, and light in a range of green wavelengths, and a reflecting mirror, a dichroic mirror or the like for converting the optical axes of pencils of light in the respective color wavelength ranges and guiding the optical axes to the same optical axis.

Specifically, the light guiding optical system 370 includes the first dichroic mirror 371, a second dichroic mirror 373, a third dichroic mirror 375, the reflecting mirror 377, and a plurality of collective lenses 379.

The first dichroic mirror 371 is disposed between the diffuse plate 317 and the collective lens group 332. In addition, the first dichroic mirror 371 transmits light in a range of blue wavelengths and reflects light in a range of green wavelengths. Light in a range of green wavelengths emitted from the luminescent plate 331 is reflected by the first dichroic mirror 371 and guided to the second dichroic mirror 373 via a collective lens 379.

The second dichroic mirror 373 is disposed at a position where light in a range of green wavelengths emitted from the first dichroic mirror 371 intersects light in a range of red wavelengths emitted from the red light source unit 350. The second dichroic mirror 373 reflects light in a range of green wavelengths and transmits light in a range of red wavelengths. The light in a range of green wavelengths emitted from the first dichroic mirror 371 is reflected by the second dichroic mirror 373 and guided to the third dichroic mirror 375 via the collective lens 379 on the left side plate 117.

In addition, light in a range of red wavelengths emitted from the red light source unit 350 transmits the second dichroic mirror 373, and its optical axis coincides with that of the light in a range of green wavelengths. Thereafter, light in a range of red wavelengths is guided to the third dichroic mirror 375 via the collective lens 379.

Meanwhile, among light in a range of blue wavelengths emitted from the excitation light shining device 310 and diffused by the diffuse plate 317, light in a range of blue wavelengths that has entered the transmission area of the luminescent plate 331 is reflected by the reflecting mirror 377, and is guided to the third dichroic mirror 375 through the collective lens 379.

The third dichroic mirror 375 reflects light in a range of green wavelengths and light in a range of red wavelengths, and transmits light in a range of blue wavelengths. Therefore, the optical axis of light in a range of green wavelengths reflected by the second dichroic mirror 373 and the optical axis of light in a range of red wavelengths transmitting the second dichroic mirror 373 are reflected by the third dichroic mirror 375 and enter a collective lens 381 of the light-source-side optical system 380. On the other hand, light in a range of blue wavelengths reflected by the reflecting mirror 377 transmits the third dichroic mirror 375 and is guided to the collective lens 381 of the light-source-side optical system 380.

As described above, light in a range of blue wavelengths, light in a range of red wavelengths, and light in a range of green wavelengths is transmitted or reflected by the third dichroic mirror 375, whereby their optical axes coincide with each other.

The light-source-side optical system 380 includes the collective lens 381, a light tunnel 383, a collective lens 385, a light shining mirror 387, and a TIR (Total Internal Reflection) prism (total reflection prism) 389. The TIR prism 389 is also part of a projection side optical system 410 described later. The collective lens 381 collects light emitted from the third dichroic mirror 375. Light in a range of blue wavelengths, light in a range of red wavelengths, and light in a range of green wavelengths collected by the collective lens 381 enter the light tunnel 383. A pencil of light entering the light tunnel 383 has a uniform intensity distribution by the light tunnel 383.

The collective lens 385 is disposed on the optical axis of the light tunnel 383 on the front side plate 113 side. The pencil of light emitted from the light tunnel 383 is collected by the collective lens 385 and irradiates the light shining mirror 387.

The projection side optical system 410 has the TIR prism 389, the display device 411, a lens barrel 412, and an aspherical mirror 417. The pencil of light reflected by the light shining mirror 387 enters the TIR prism 389 and irradiates the image formation surface of the display device 411 disposed on the front side plate 113 side. The image light formed by the display device 411 is emitted to the aspherical mirror 417 via the fixed lens group or the movable lens group 416 in the lens barrel 412 provided on the rear plate 115 side.

The image light reflected by the aspherical mirror 417 is emitted to the outside of the projector 100 via a cover glass 419 (see also FIG. 1), and is projected on the screen.

With the configuration of the projector 100 as described above, when the luminescent plate 331 is rotated and light is emitted from the excitation light shining device 310 and the red light source unit 350 at different timings, light in a range of blue wavelengths, light in a range of red wavelengths, and light in a range of green wavelengths each sequentially enter the collective lens 381, the light tunnel 383, and the like of the light-source-side optical system 380 via the light guiding optical system 370, and after that enters the display device 411. Therefore, it is possible to project the color image on the screen by time-divisionally reflecting light of each color according to the data displayed with the DMD, which is the display device 411 of the projector 100.

Figure 4:
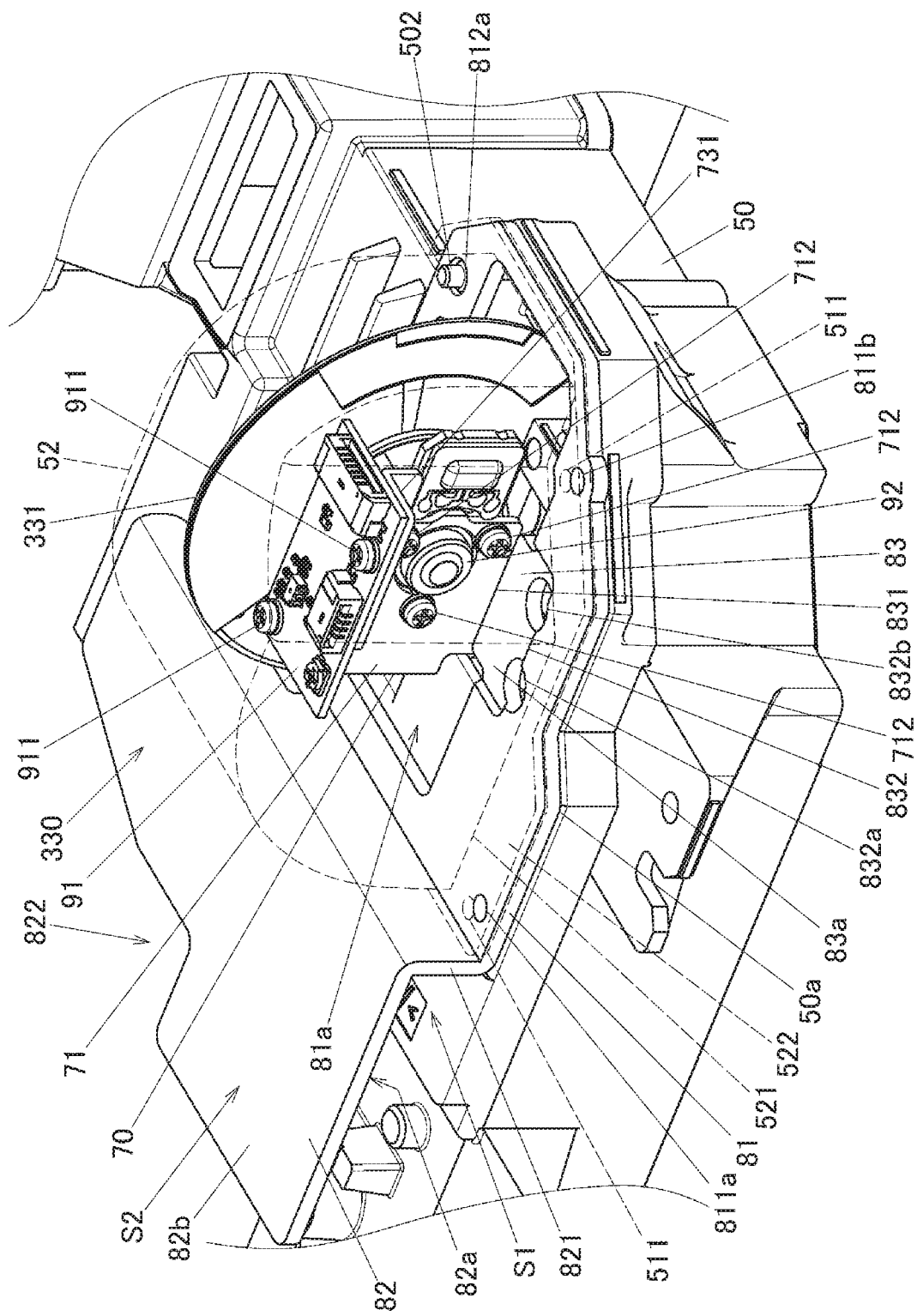
FIG. 4 is a perspective view of surroundings of the green light source unit of the light source unit according to the embodiment of the present invention.
Figure 5:
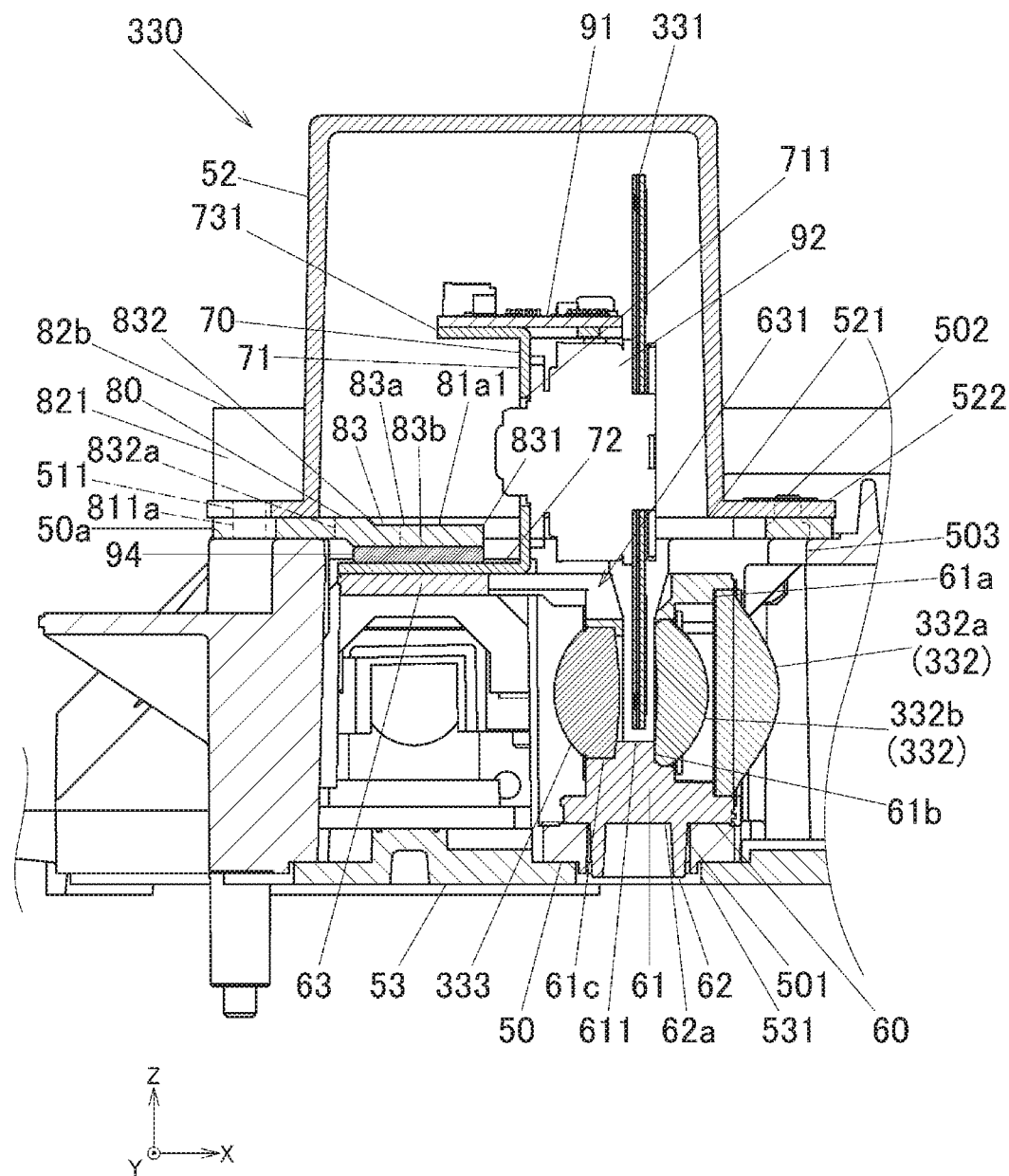
FIG. 5 is a V-V sectional view of the green light source unit shown in FIG. 3 according to the embodiment of the present invention.
Figure 6:
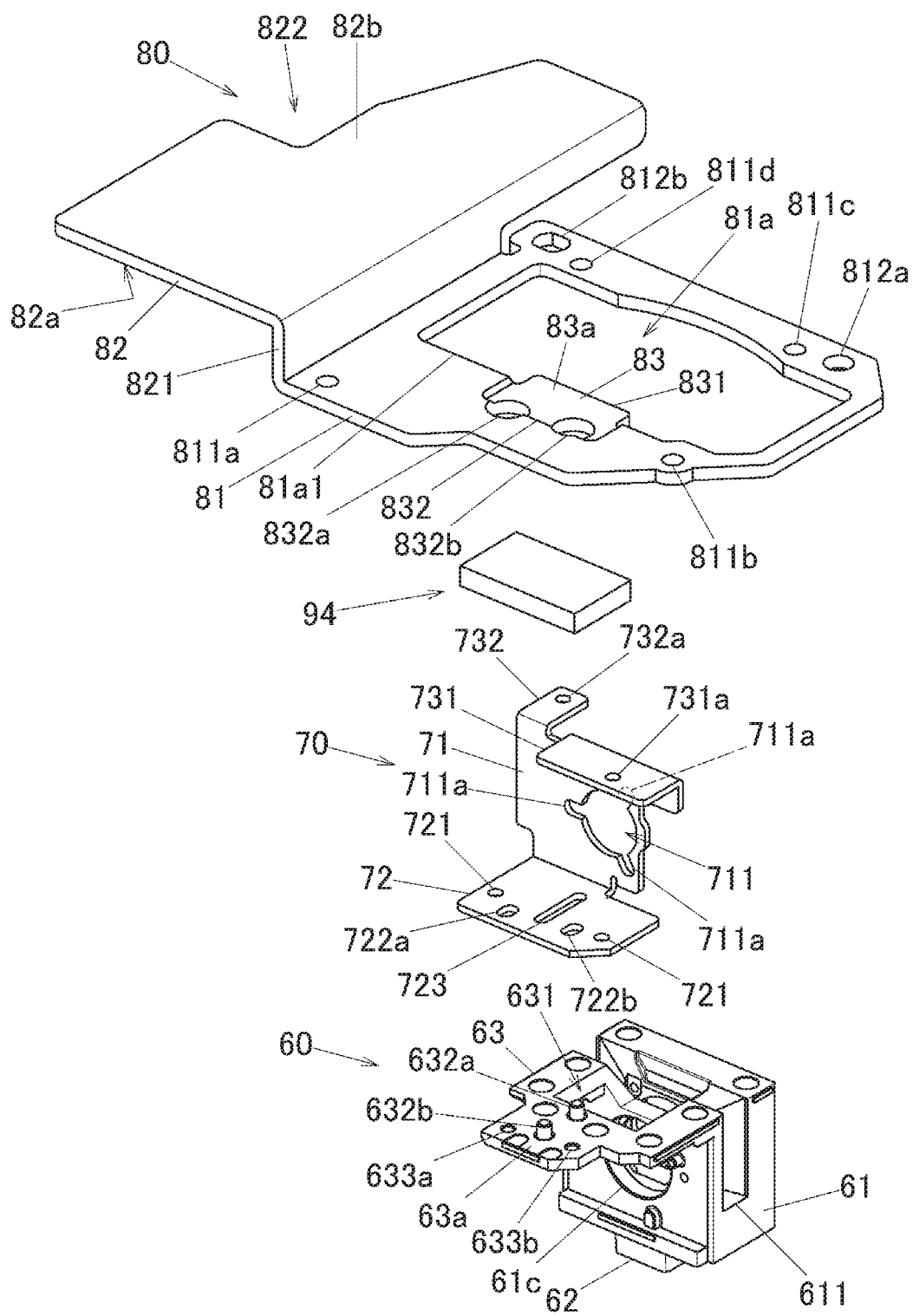
FIG. 6 is an exploded perspective view of a barrel, a support member, a heat transfer member, and a heat dissipating member according to the embodiment of the present invention.

Next, the configuration of surroundings of the green light source unit 330 of the present embodiment will be described with reference to FIGS. 4 to 6. FIG. 4 is a perspective view of the surroundings of the green light source unit 330 of the light source unit 250 as viewed from the P direction in FIG. 3. FIG. 5 is a V-V sectional view of the green light source unit 330 of FIG. 3. Further, FIG. 6 is a perspective view of a barrel 60, which is a holding member, a support member 70, a heat transfer member 94, and a heat dissipating member 80.

As shown in FIG. 5, the green light source unit 330 includes a plurality of collective lenses 331a, 332b, 333 supported by the barrel 60, and the luminescent plate 331 supported by the motor 92. An optical apparatus is constituted by the motor 92 and the luminescent plate 331. The green light source unit 330 is disposed in the light source case 50 and a cover 52 that covers a second opening 503 provided on the upper surface of the light source case 50. The cover 52 has a flange 522 on the opening edge 521 and is formed in a bottomed square tubular shape (See also FIG. 4). In addition, a plurality of hole portions 511 for fixing are formed in the flange 522.

First, the barrel 60 will be described. As shown in FIG. 5, the barrel 60 is fixed to the light source case 50. The barrel 60 includes a main body 61, a heat dissipating portion 62, and a fixing portion 63.

The main body 61 is formed in a substantially rectangular parallelepiped shape. Further, the main body 61 includes three lens holding portions 61a, 61b, 61c. The lens holding portions 61a to 61c are arranged in the order of a lens holding portion 61a, a lens holding portion 61b, and a lens holding portion 61c in the negative X-axis direction where light emitted from the excitation light shining device 310 is incident. The lens holding portion 61a and the lens holding portion 61b hold a collective lens 332a and a collective lens 332b, respectively. Further, the lens holding portion 61c holds the collective lens 333. The central axis of each collective lens 331a, 332b, 333 substantially coincides with the optical axis of light emitted from the excitation light shining device 310. In this manner, an optical path is formed in the main body 61.

A groove 611 is provided between the lens holding portion 61b and the lens holding portion 61c of the main body 61. The groove 611 is formed so as to open to the motor 92 side in the sectional view of FIG. 5. The groove 611 is formed in a planar direction (Y-Z plane direction) substantially perpendicular to the optical axis of light emitted from the excitation light shining device 310 which enters the collective lenses 331a, 332b, 333.

The heat dissipating portion 62 is erected downward from the lower surface of the main body 61. The heat dissipating portion 62 is formed in a substantially rectangular tube shape having a bottom portion 62a. The heat dissipating portion 62 is disposed in an opening 501 provided in the lower side of the light source case 50 and in an opening 531 of a lid 53, and is formed so that the cooling air outside the light source case 50 can be directly blown to the heat dissipating portion 62.

The fixing portion 63 extends from the upper portion of the main body 61 on the lens holding portion 61c side. The fixing portion 63 is formed in a plate shape substantially parallel to the X-Y plane toward the side opposite to the groove 611. As shown in FIG. 6, an opening 631 is formed on the base portion of the fixing portion 63. Two positioning projections 632a and 632b are formed on the upper surface 63a of the fixing portion 63 on the tip side. The two positioning projections 632a and 632b are arranged in the direction of the optical axis of light entering the collective lenses 331a, 332b, 333 from the excitation light shining device 310.

The support member 70 is formed in a substantially frame shape that is open to the heat dissipating member 80 side (see FIG. 5). As shown in FIG. 6, the support member 70 has a base plate 71. A lower support plate 72 extends from the lower end of the base plate 71 in a direction substantially perpendicular to the base plate 71.

A substantially circular fixing hole 711 for fixing the motor 92 shown in FIG. 5 is formed substantially at the center of the base plate 71. A plurality of notches 711a are formed on the inner edge of the fixing hole 711. The motor 92 is fixed by being fastened to the notches 711a by a plurality of screws 712 shown in FIG. 4.

The lower support plate 72 has two through holes 721 and three longholes 721a, 722b, 723. The three longholes 721a, 722b, 723 are provided inside the two through holes 721. The longitudinal direction of each of the longholes 721a, 722b, 723 coincides with a direction substantially perpendicular to the surface of the luminescent plate 331, that is, in the optical axis direction of light emitted from the excitation light shining device 310. The central longhole 723 provided between the longhole 722a and the longhole 722b is formed to be longer than the longhole 722a and the longhole 722b.

The positioning projections 631a, 632b disposed on the fixing portion 63 of the barrel 60 are inserted into the longhole 723. This allows the support member 70 to move in the direction of the optical axis of light emitted from the excitation light shining device 310, and prevents the support member 70 from moving in a direction perpendicular to the optical axis direction thereof and in a direction parallel to the upper surface 63a. The position of the support member 70 is fixed by screwing the screws inserted through the longholes 721a, 722b into the screw holes 633a, 633b of the fixing portion 63. Therefore, by adjusting and fixing the position of the support member 70 to the barrel 60, the support member 70 is fixed to the light source case 50 via the barrel 60.

An upper support plate 731, 732 extends from the upper end of the base plate 71 in a direction substantially perpendicular to the base plate 71. The lower support plate 72 and the upper support plate 731 are formed in the same direction. On the other hand, an upper support plate 732 is formed from the base plate 71 in a direction opposite to the upper support plate 731.

The upper support plate 731 is formed to be wider than the upper support plate 732. A screw hole 731a is formed in the upper support plate 731. In addition, a screw hole 732a is formed in the upper support plate 732. The upper surfaces of the upper support plate 731 and the upper support plate 732 are formed on substantially the same plane, and a circuit board 91 is placed on the upper surfaces (see FIGS. 4 and 5). The circuit board 91 is fixed by screwing screws inserted through through holes (not shown) provided at approximately diagonal positions into the screw holes 731a, 732a.

A control circuit for controlling the motor 92 is formed on the circuit board 91. A cable (not shown) is connected to the circuit board 91 that transmits and receives control signals to and from the main control circuit board 441 and the like.

The heat dissipating member 80 is disposed on the upper surface 50a of the light source case 50 (see FIG. 5). In FIG. 6, the heat dissipating member 80 is formed in a plate shape. The heat dissipating member 80 includes a fixing portion 81 fixed to the light source case 50 and a fin 82 for dissipating the heat transmitted from the fixing portion 81. The fixing portion 81 is formed in a substantially rectangular frame shape having a first opening 81a at the center of the fixing portion 81 and has round hole portions 811a to 811d penetrating at four corners of the fixing portion 81. The fixing portion 81 has a positioning hole portion 811a, 812b through which the positioning projection 502 (part of it is shown in FIG. 5) erected from the upper surface 50a of the light source case 50 is inserted. The positioning hole portion 812b is formed in a shape of a longhole.

A heat transmission portion 83 is formed on the inner edge 81a1 of the first opening 81a. The heat transmission portion 83 is formed in a substantially rectangular shape and has a protruding portion 831 part of which protrudes inside of the first opening 81a. In addition, the heat transmission portion 83 has an upper surface 83a where the upper surface 83a including the periphery of an edge portion 81a1 is recessed downward (see also FIG. 5). On the other hand, the heat transmission portion 83 has a lower surface 83b where the lower surface 83b including the periphery of the edge portion 81a1 protrudes downward. Two substantially circular through holes 831a, 832b are formed at a boundary edge 832 between the heat transmission portion 83 and the fixing portion 81. The head portion of the screw screwed into the screw hole 633a, 633b via the longhole 721a, 722b is accommodated in the through hole 831a, 832b so that the head portion of the screws do not interfere with the fixing portion 81 when the support member 70 is fixed to the barrel 60.

The fin 82 extends from the edge of the fixing portion 81 via a connection portion 821. The fin 82 and the fixing portion 81 are formed substantially in parallel. The connection portion 821 is connected substantially perpendicularly to the fixing portion 81 and the fin 82. The fin 82 has a substantially rectangular shape, and has a notch 822 at one distal corner of the fin 82.

As shown in FIG. 4, providing the connection portion 821 between the lower surface 82a of the fin 82 and the light source case 50 forms a gap. This gap forms a cooling air flow path S1 for cooling the fin 82. Further, a cooling air flow path S2 is formed between the upper surface 82b of the fin 82 and the inner wall of the upper case 110 of the projector 100 shown in FIG. 1.

The screws inserted into the hole portions 811a, 811b of the fixing portion 81 of the heat dissipating member 80 and the hole portions 511 of the cover 52 are screwed into and fixed to the screw holes (not shown) of the light source case 50. Thereby, the cover 52 is fixed to the light source case 50. The heat dissipating member 80 is disposed so that the peripheral edge of the first opening 81a is sandwiched by the flange 522 and the peripheral edge of the second opening 503 of the light source case 50, and is fastened together with the cover 52. Thus the heat dissipating member 80 is fixed to the light source case 50.

The heat transfer member 94 such as a thermal sheet is disposed between the heat dissipating member 80 and the support member 70. The heat transfer member 94 is sandwiched by the heat dissipating member 80 and the support member 70. The direction where the heat transfer member 94 is sandwiched is a direction perpendicular to the direction in which the position of the support member 70 can be adjusted (in the present embodiment, the Z-axis direction, which is a direction perpendicular to the optical path). Thus, the support member 70 is connected to the heat dissipating member 80 via the heat transfer member 94. In addition, the heat transfer member 94 is formed of a thermally conductive flexible member. For example, materials having flexibility such as resin or rubber, and having electrical insulating property and heat resistance can be used for the heat transfer member 94. Therefore, when the heat transfer member 94 is sandwiched by the lower support plate 72 and the heat transmission portion 83, the heat transfer member 94 is deformed so as to follow the contact surface of the lower support plate 72 and the heat transmission portion 83, so that the contact area is widened, and the heat transfer effect can be enhanced. In addition, since the heat transmission portion 83 has a convex shape, it is possible to prevent the heat transfer member 94 that has flown out to a portion except for the heat transmission portion 83 from excessively spreading to a region where heat conduction is not required.

In a case where the heat dissipating member 80 has higher temperature than the light source case 50, the heat of the heat dissipating member 80, where the heat has been transferred from the support member 70 via the heat transmission portion 83, dissipates from both of the fin 82 and the light source case 50 as shown in the present embodiment, so that a high heat dissipating effect can be obtained. On the other hand, in a case where the light source case 50 has higher temperature than the heat dissipating member 80, if heat is easily transferred between the light source case 50 and the heat dissipating member 80, the temperature of the heat dissipating member 80 is increased, and the efficiency of the heat dissipating effect of the motor 92 and the luminescent plate 331 is lowered. Therefore, in this case, a heat insulating member having low thermal conductivity is provided between the heat dissipating member 80 and the light source case 50. The heat insulating member is formed in a frame shape so as to seal the peripheral edge of the second opening 503 and the first opening 81a of the light source case 50. This configuration shuts off the heat transfer from the light source case 50 to the heat dissipating member 80 to make the heat dissipating member 80 independent as a heat flow path and can efficiently transmit the heat transferring from the motor 92 to the fin 82 of the heat dissipating member 80. For example, silicon or polyethylene terephthalate (PET) can be applied for the heat insulating member. Further, a heat insulating member between the heat dissipating member 80 and the light source case 50 can have a dustproof effect.

While, in the present embodiment, the barrel 60 and the support member 70 are shown as separate bodies, the barrel 60 and the support member 70 may be integrated. As a result, the motor 92 and the luminescent plate 331 can be integrally fixed to the holding member together with the collective lenses 331a, 332b, 333, and there is no need for a position adjustment between the luminescent plate 331 and the collective lenses 331a, 332b, 333. In a case where the barrel 60 and the support member 70 are integrated, the motor 92 and the luminescent plate 331 can be structured such that the luminescent plate 331 is placed in from the direction in which it does not interfere with the groove 611 of the barrel 60 and is fixed to the barrel 60.

Further, although the configuration in which the optical apparatus includes the motor 92 and the luminescent plate 331 has been described, the optical apparatus may have other configurations depending on the configuration of the light source unit 250. For example, the luminescent plate 331 may be a color wheel including a color filter that shields light with a specific wavelength, or a luminescent material layer of the luminescent plate 331 may be a luminescent material layer that emits luminescent light of colors other than green. Further, the optical apparatus may not include the motor 92 and may include optical members such as a fixed luminescent plate, a diffuse plate, a polarizing plate, a reflecting mirror, and the like.

In addition, a plurality of fins 82 extending from the connection portion 821 may be provided to enhance the heat dissipating effect.

As described above, in the present embodiment, the support member 70 is configured to have a heat flow path to the heat dissipating member 80 between the support position of the motor 92 and the fixed position of the barrel 60 in the light source case 50. Therefore, the heat of the motor 92 to be cooled can be dissipated at a position in front of the fixing position of the barrel 60 in the light source case 50 (that is, the position on the motor 92 side), so that the heat dissipating effect can be more effectively provided than before. The support member 70 to which the motor 92 is attached is adjusted and fixed with respect to the optical axis direction of light emitted from the excitation light shining device 310, which is the position adjustment direction. On the other hand, the direction in which the heat dissipating member 80 is pressed when the heat transfer member 94 is sandwiched is a direction substantially perpendicular to the position adjustment direction of the support member 70. Therefore, occurrence of misalignment of the luminescent plate 331 due to the installation of the heat transfer member 94 can be suppressed. Further, since the heat dissipating member 80 is fixed together with the cover 52 so as to seal the peripheral edge of the second opening 503 of the light source case 50, the dustproof performance can be secured. Further, since the heat flow path for dissipating the heat of the motor 92 is provided relatively close to the motor 92 so as to dissipate the heat, the rise in temperature of the motor 92 can be reduced.

The light source unit 250 of the present embodiment includes the support member 70 for supporting the optical apparatus (the luminescent plate 331 and the motor 92), the light source case 50 for fixing the support member 70, the heat dissipating member 80 fixed to the light source case 50, and the heat transfer member 94 disposed between the member 70 and the light source case 50. Therefore, even when the distance between the optical apparatus to be cooled and the light source case 50 to which the support member 70 is fixed is long, the heat dissipating performance of the light source unit 250 and the projector 100 can be improved.

In addition, in the light source unit 250 where the heat transfer member 94 is sandwiched by the heat dissipating member 80 and the support member 70, the heat transfer member 94 is deformed so as to follow the contact surface of the lower support plate 72 and the heat transmission portion 83, so that the contact area is widened, and the heat transfer effect can be enhanced.

In the light source unit 250 where the heat transfer member 94 is sandwiched in the direction perpendicular to the position adjustment direction of the support member 70, the heat transfer member 94 can be arranged such that a positional deviation with respect to the optical axis direction of the light entering the optical member due to the arrangement of the heat transfer member 94 is prevented.

In addition, in the light source unit 250 where the heat dissipating member 80 includes the heat transmission portion 83 protruding toward the support member 70 and contacting the heat transfer member 94, the heat transfer member 94 can be caused to securely contact a region where it is desirable to transfer heat. In addition, it is possible to prevent the heat transfer member 94 from excessively expanding to a region where there is no need for heat conduction.

In the light source unit 250 including a bottomed cylindrical cover 52 having the flange 522 at an opening edge thereof, where the heat transmission portion 83 is formed on the inner edge of the first opening 81a of the heat dissipating member 80, and the peripheral edge of the first opening 81a is sandwiched between the flange 522 and the peripheral edge of the second opening 503 of the light source case 50, the heat dissipating member 80 is disposed without deteriorating the dustproof function with respect to the optical member that protrudes from the light source case 50 and which is covered with the cover 52, whereby the heat dissipating effect can be enhanced.

The light source unit 250, where the support member 70 is fixed to the light source case 50 via a holding member (barrel 60) that holds the optical member (collective lenses 331a, 332b, 333), can individually conduct the position adjustment between the optical member of the support member 70 and other optical components of the holding member. Therefore, even when the processing precision of the support member 70 and the holding member is not sufficient, the position adjustment step allows the light source unit 250 to be configured with high assembling precision. In addition, since the holding member can be fixed to the light source case 50 first, and after that the position of the support member 70 can be adjusted, the position of the luminescent plate 331 supported by the support member 70 can be precisely adjusted by emitting light from the excitation light shining device 310 or the like.

In addition, the light source unit 250, where the optical member is the collective lenses 331a, 332b, 333, and the optical apparatus includes the luminescent plate 331 and the motor 92 capable of moving the optical function portion (luminescent light emitting area, transmission area) of the luminescent plate 331 onto the optical axis of the collective lenses 331a, 332b, 333, allows the optical function portion of the luminescent plate 331 to which the cooling mechanism cannot be directly attached to be arranged on the optical path of light collected by the collective lens. Since the motor 92 rotates at a high speed, noise is generated. This noise may increase as the heat generated from the luminescent plate 331 is transferred to the motor 92 and the temperature of the motor 92 rises. Therefore, improvement in the heat radiation function of the motor 92 can also reduce the noise generated from the motor 92.

Further, since the light source unit 250, where the heat dissipating member 80 includes the fin 82 arranged with a gap between the heat dissipating member 80 and the light source case 50, can secure the flow path of the cooling air on the front (the upper surface 82b side) and the back (the lower surface 82a side) of the heat dissipating member 80, the heat dissipating function can be enhanced.

In addition, even when the temperature of the light source case 50 is higher than the temperature of the heat dissipating member 80, the light source unit 250 including the heat insulating member sandwiched between the light source case 50 and the heat dissipating member 80 can prevent the heat from flowing into the heat dissipating member 80 from members other than the object to be cooled, and can prevent the heat dissipating function of the object to be cooled from deteriorating.

The embodiments described above are presented by way of example and are not intended to limit the scope of the invention. These novel examples can be carried out in other various forms, and various omissions, replacements or modifications can be made thereto without departing from the spirit and scope of the invention. The examples of the embodiment and modifications that are made thereto are to be incorporated in the spirit and scope of the invention and are also to be incorporated in the scope of inventions set forth in claims and equivalents thereof.

What is claimed is:

1. A light source unit comprising:
 a support member that supports a heat generator,
 a heat transfer member connected to the support member, and
 a heat dissipating member connected to the heat transfer member,
 wherein the support member, the heat generator, the heat transfer member, and the heat dissipating member are provided inside a space formed by a case having a second opening and a cover,
 wherein the heat dissipating member is arranged to extend from the inside of the space to an outside of the space via a space sandwiched by the case and the cover, so as to be sandwiched by and in direct contact with the case and the cover, within said space sandwiched by the case and the cover,
 wherein the heat dissipating member is fixed to the case, and has a first opening corresponding to the second opening,
 wherein the cover is formed in a bottomed cylindrical shape and includes a flange on an opening edge of the cover, and
 wherein a peripheral edge of the first opening of the heat dissipating member is sandwiched by the flange of the cover and a peripheral edge of the second opening of the case.

2. The light source unit according to claim 1, wherein:
 the heat generator is an optical apparatus,
 the case fixes the support member,
 the heat dissipating member includes a heat transmission portion protruding into the first opening, and
 the heat transfer member is sandwiched by the heat transmission portion of the heat dissipating member and the support member.

3. The light source unit according to claim 2, wherein the heat transfer member is sandwiched in a direction perpendicular to a position adjustment direction of the support member.

4. The light source unit according to claim 3, wherein the heat dissipating member includes a fin disposed with a gap between the heat dissipating member and the case.

5. The light source unit according to claim 3, wherein the heat transmission portion protrudes toward the support member to contact the heat transfer member.

6. The light source unit according to claim 2, wherein the heat dissipating member includes a fin disposed with a gap between the heat dissipating member and the case.

7. The light source unit according to claim 6, wherein the heat transmission portion protrudes toward the support member to contact the heat transfer member.

8. The light source unit according to claim 2, wherein the heat transmission portion protrudes toward the support member to contact the heat transfer member.

9. The light source unit according to claim 1, wherein the heat transfer member is sandwiched in a direction perpendicular to a position adjustment direction of the support member.

10. The light source unit according to claim 9, wherein the heat dissipating member includes a fin disposed with a gap between the heat dissipating member and the case.

11. The light source unit according to claim 9, wherein:
 the heat dissipating member includes a heat transmission portion protruding into the first opening, and
 the heat transmission portion protrudes toward the support member to contact the heat transfer member.

12. The light source unit according to claim 1, wherein the heat dissipating member includes a fin disposed with a gap between the heat dissipating member and the case.

13. The light source unit according to claim 12, wherein:
 the heat dissipating member includes a heat transmission portion protruding into the first opening, and
 the heat transmission portion protrudes toward the support member to contact the heat transfer member.

14. The light source unit according to claim 1, wherein:
 the heat dissipating member includes a heat transmission portion protruding into the first opening, and
 the heat transmission portion protrudes toward the support member to contact the heat transfer member.

15. The light source unit according to claim 1, wherein the support member is fixed to the case via a holding member that holds an optical member.

16. The light source unit according to claim 15, wherein:
 the optical member is a collective lens,
 the heat generator is an optical apparatus, and
 the optical apparatus includes a luminescent plate and a motor capable of moving an optical function portion of the luminescent plate onto an optical axis of the collective lens.

17. The light source unit according to claim 1, further comprising a heat insulating member sandwiched between the case and the heat dissipating member.

18. A projector comprising:
 a light source unit according to claim 1;
 a display device which is irradiated with light source light from the light source unit to form image light;
 a projection side optical system configured to project the image light emitted from the display device onto a screen; and
 a control module configured to control the display device and the light source unit.

19. A projector comprising:
 a light source unit according to claim 2;
 a display device which is irradiated with light source light from the light source unit to form image light;

a projection side optical system configured to project the image light emitted from the display device onto a screen; and a control module configured to control the display device and the light source unit.

\* \* \* \* \*